US010754512B1

(12) United States Patent
Greene et al.

(10) Patent No.: US 10,754,512 B1
(45) Date of Patent: Aug. 25, 2020

(54) DYNAMIC INSTREAM AUTOPLAY BASED ON PRESENCE OF WATCH WHILE MINI PLAYER

(71) Applicant: Google Inc., Mountain View, CA (US)

(72) Inventors: Kevin Greene, San Francisco, CA (US); Justin Lewis, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 363 days.

(21) Appl. No.: 15/676,719

(22) Filed: Aug. 14, 2017

Related U.S. Application Data

(63) Continuation of application No. 14/300,144, filed on Jun. 9, 2014, now Pat. No. 9,733,809.

(51) Int. Cl.
*G06F 3/14* (2006.01)
*G06F 3/0484* (2013.01)
*G06F 3/0482* (2013.01)

(52) U.S. Cl.
CPC .......... *G06F 3/0484* (2013.01); *G06F 3/0482* (2013.01)

(58) Field of Classification Search
CPC .......................................................... G06F 3/14
USPC ............. 715/716; 709/219; 719/313; 725/36
See application file for complete search history.

(56) References Cited

U.S. PATENT DOCUMENTS

| | | | |
|---|---|---|---|
| 8,752,085 B1 | 6/2014 | Brueck et al. | |
| 2007/0088727 A1 | 4/2007 | Kindig | |
| 2009/0228897 A1* | 9/2009 | Murray | G06F 9/544 719/313 |
| 2012/0221687 A1* | 8/2012 | Hunter | G06F 16/435 709/219 |
| 2014/0059597 A1* | 2/2014 | Issa | G06Q 30/0241 725/36 |
| 2014/0196098 A1 | 7/2014 | Wen et al. | |
| 2015/0220264 A1 | 8/2015 | Lewis et al. | |

* cited by examiner

*Primary Examiner* — Ruay Ho
(74) *Attorney, Agent, or Firm* — Lowenstein Sandler LLP

(57) ABSTRACT

Dynamic media players are disclosed. A method for providing the dynamic media players includes presenting a first media player and a plurality of elements in a user interface (UI); providing a first playback of a first media item in the first media player in the UI; in response to receiving user input, scrolling the plurality of elements to remove from view one or more of the plurality of elements that were visible in the UI prior to the user input, and to display, in the UI, a second media player that was not visible in the UI prior to the user input; determining that the second media player is configured to start a second playback of a second media item without a user playback request; and stopping the first playback of the first media item and providing the second playback of the second media item without the user playback request.

20 Claims, 6 Drawing Sheets

DYNAMIC INSTREAM AUTOPLAY BASED ON PRESENCE OF WATCH WHILE MINI PLAYER

RELATED APPLICATIONS

This application is a continuation application of U.S. patent application Ser. No. 14/300,144, filed on Jun. 9, 2014, the entire contents are hereby incorporated by reference.

TECHNICAL FIELD

Implementations of the present disclosure relate to content playback, and more specifically, to handling play back of multiple media items on a screen.

BACKGROUND

The Internet allows people to obtain information, connect with others and share information with each other. Common Internet destinations include news websites, content sharing platforms, social networking platforms, and the like. Many websites and platforms include a content sharing aspect that allows users to upload, view, and share media items, such as video content, image content, audio content, and so on. Other users may comment on the shared content, discover new content, locate updates, share additional content, and otherwise interact with the provided content. The shared media items may include content from professional content creators, e.g., creators of movies, music, and articles, as well as media items from amateur content creators, e.g., creators of video and photo blogging, short original videos, and status updates.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method includes presenting, by an electronic device, a user interface (UI) that includes a media player portion and a scrollable portion, the media player portion having a first media player to provide playback of a first media item. The method further includes in response to user input, scrolling to an area in the scrollable portion that includes a second media player while continuing to play the first media item by the first media player that remains visible in the UI. The method further includes determining that a second media item to be played by the second media player is configured to start playing without a user playback request. The method further includes preventing the second media player from providing playback of the second media item while the first media item is being played by the first media player that is visible in the UI.

In some implementations, the second media item can include an audio component and a video component. Preventing the second media player from providing playback of the second media item while the first media item is being played by the first media player that can be visible in the UI can include preventing playback of the audio component of the second media item while permitting playback of the video component of the second media item. The second media item can include an audio component and a video component. Preventing the second media player from providing playback of the second media item while the first media item is being played by the first media player that can be visible in the UI can include preventing playback of the video component of the second media item while permitting playback of the audio component of the second media item. The method can include providing playback of the first media item in the first media player. The method can further include receiving input, via the UI, to playback the second media item. The method can further include stopping playback of the first media item that can be being presented in the first media player. The method can further include providing playback of the second media item in the second media player. The method can include providing playback of the first media item in the first media player. The method can further include receiving, via scrollable portion of the UI, a user request to perform an activity that can be independent of the viewing of the first media item. The method can further include presenting content associated with the requested activity while continuing to provide playback of the first media item in the first media player. The scrollable portion of the UI can include a list of a plurality of media items. The scrollable portion of the UI can include a feed that can be an aggregation of feed items from sources to which the user can be subscribed. Preventing the second media player from providing playback of the second media item while the first media item is being played by the first media player that can be visible in the UI can include adding the second media item to a playlist. Media items in the playlist can be played back in the first media player. The method can include providing playback of the second media item in the second media player when the playback of the first media item is complete. The first media player can be no longer visible in the UI when the playback of the first media item is complete.

In additional implementations, computing devices for performing the operations of the above described implementations are also disclosed. Additionally, in implementations of the disclosure, a computer readable storage media stores methods for performing the operations of the above described implementations. Further, in implementations of the disclosure, means for performing the operations of the above described implementations are also disclosed.

BRIEF DESCRIPTION OF THE DRAWINGS

The present disclosure is illustrated by way of example, and not by way of limitation, in the figures of the accompanying drawings.

DETAILED DESCRIPTION

Described herein is a mechanism for handling play back of multiple media items on a screen. Some conventional media players (e.g., a video player presented within a browser or an application on a mobile device) may automatically play a media item when it appears in a user interface (UI) (e.g., directly in a feed) and may play the media item even if another media item is already playing in the UI. In such instances, two media items would be playing in the UI at the same time. For example, conventional media players may play two overlapping videos. In another example, two different audio tracks may play simultaneously, which can negatively impact user experience. Moreover, it may be difficult to determine an accurate number of views for a media item if the media item was played with other media items on user devices at the same time.

Implementations of the present disclosure address the above deficiencies of conventional systems by providing dynamic playback of media items based on a presence of a "watch while" media player. A watch while media player can refer to a media player that remains visible in a user interface (UI) as a user interacts with an electronic device (e.g., navigates to different documents, browses content, opens different applications). While the media item is being presented in the watch while media player, the user may continue to interact with the electronic device to, for example, decide what to watch next, search for another media item, and/or browse media items of the content sharing platform, continue social networking—all without interrupting playback of the media item. The electronic device can present a UI that includes a media player portion and a scrollable portion. The media player portion can have a first media player that provides playback of a first media item. The scrollable portion can include a second media item that is configured to start playing without a user playback request (e.g., autoplay). A video might autoplay in a UI based on a variety of signals. Some examples include: the video is in a central area of the UI, the video has newly entered or become visible in the UI, a previously playing video finished autoplaying, or some combination thereof. In response to a user scrolling or similar operation, the electronic device can present the second media player in the UI while continuing to play the first media item by the first media player that remains visible in the UI.

While the first media item is being played by the first media player that is visible in the UI, the electronic device prevents the second media player from automatically playing the second media item, thereby improving user experience, and media item consumption tracking, among other benefits. Further, advertisements can be presented in a media player that is continuously visible in the UI, thereby enhancing monetization of online content.

Figure 1:
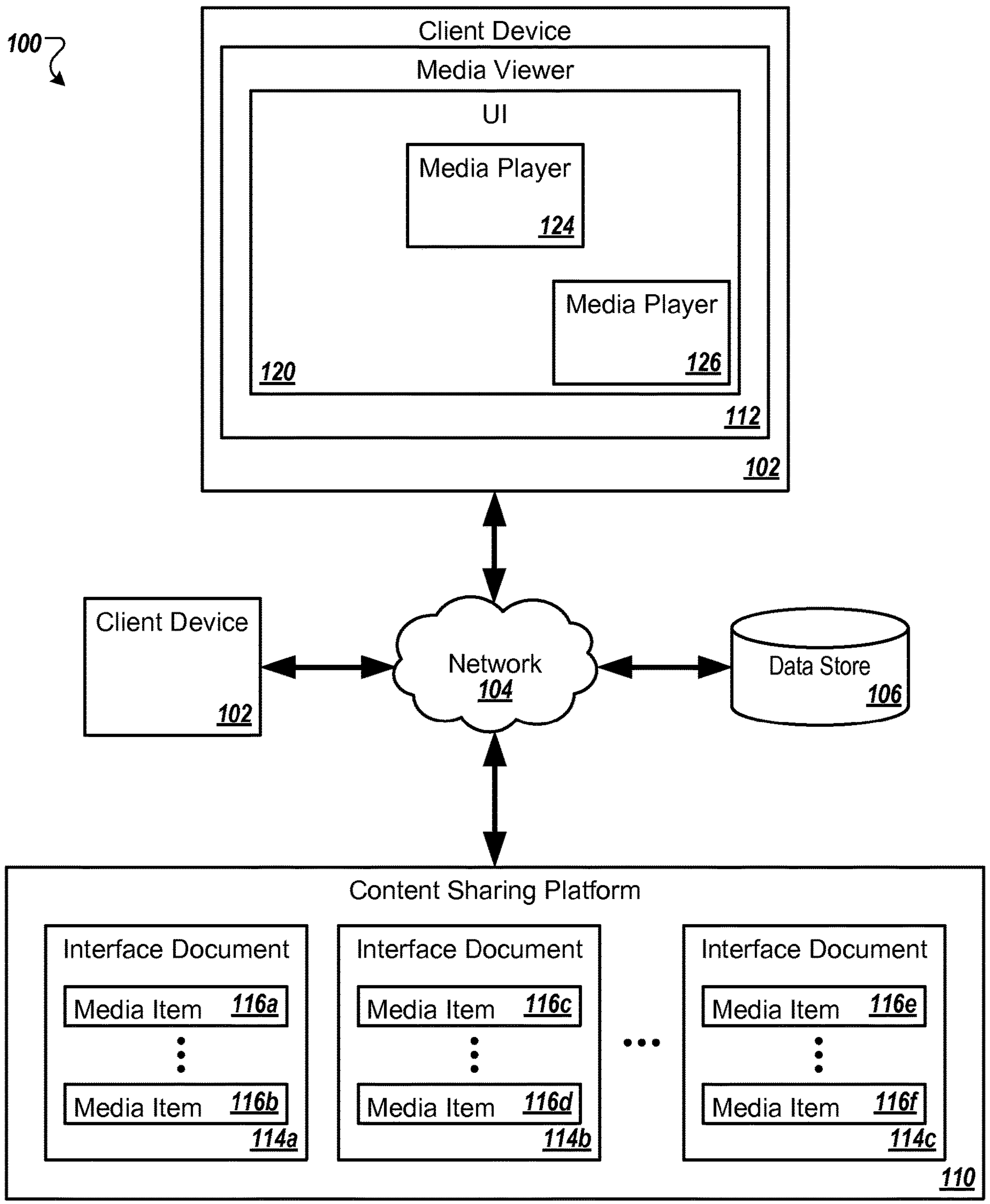
FIG. 1 illustrates an example system architecture, in accordance with one implementation of the disclosure.

FIG. 1 illustrates an example system architecture 100, in accordance with one implementation of the disclosure, for dynamically presenting media items in one or more media players. The system architecture 100 includes any number of client devices 102, a network 104, a data store 106, and a content sharing platform 110.

The one or more client devices 102 may each include computing devices such as personal computers (PCs), laptops, mobile phones, smart phones, tablet computers, netbook computers etc. In some implementations, client device 102 may also be referred to as "user devices."

In one implementation, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In one implementation, the content sharing platform 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 110 may allow a user to consume, upload, search for, approve of ("like"), dislike, and/or comment on media items. The content sharing platform 110 may also include a website (e.g., a webpage) that may be used to provide a user with access to the media items. Content sharing platform 110 may include any type of content delivery network providing access to content and/or media items and can include a social network, a news outlet, a media aggregator, and the like. Implementations of the disclosure are not limited to content sharing platforms or to platforms that provide channel subscriptions to users.

Each client device includes a media viewer 112. In one implementation, the media viewer 112 may be an application that allows users to consume content and media items, such as images, videos, web pages, documents, etc. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media item presentation component) to a user. In another example, the media viewer 112 may be a standalone application that allows users to view digital media items (e.g., digital videos, digital images, electronic books, etc.). The media viewer 112 may be provided to the client devices 102 by a server (not shown) and/or content sharing platform 110. For example, the media viewer 112 may include one or more embedded media players that are embedded in web pages provided by the content sharing platform 110. In another example, the media viewer 112 may be an application that is downloaded from the server.

The content sharing platform 110 may provide one or more user interface documents 114*a-c* that can be interpreted by a media viewer 112 on client device 102. The interface document can be any type of navigable electronic document, where some of the document is visible in a user interface while another portion of the electronic document is not currently visible in the user interface but may become visible based on user input. For example, upon a user activation of a scrolling mechanism (e.g., via a scrollbar, a scroll wheel, a touchscreen movement, automatic scrolling, etc.), different portions of the interface document can become visible while other portions can become no longer visible. The interface document can be scrollable vertically, horizontally, or a combination thereof. Examples of interface documents include a web page or a mobile app user interface document presenting a stream of content (frequently updated content) such as a news feed, an activity feed a social feed or a blog, a web page or a user interface document presenting predefined content such as a home page or a news page, etc. A user can navigate (e.g., via a gesture, scroll, click, swipe, etc.) to portions of the interface document that are not currently visible in the user interface.

Each interface document 114 may include one or more media items 116. Examples of a media item 116 can include, and are not limited to, digital video, digital movies, digital photos, photo albums, digital music, website content, social media updates, video-on-demand, live-streamed media, electronic books (ebooks), electronic magazines, digital newspapers, digital audio books, electronic journals, web log (blog) entries, real simple syndication (RSS) feeds, electronic comic books, software applications, advertisements, etc. In some implementations, media item 116 is also referred to as a content item.

In implementations, the interface document 114 can include metadata associated with each media item 116. For example, the metadata can include various information about the media item 116, such as a title, description, keywords, content type, width, height, a graphical representation associated with the media item (e.g., a thumbnail), an address, a username of an owner of the media item, a hashtag associated with the media item, an application name, one or more media item identifiers, whether the media item is to autoplay, whether the media item is to be played back without user input when it is presented in a UI, among others.

A media item 116 may be consumed via the media viewer 112 (e.g., web browser, mobile device application). For brevity and simplicity, an online video (also hereinafter referred to as a video) is used as an example of a media item 116. As used herein, "media," media item," "online media item," "digital media," "digital media item," "content," and "content item" can include an electronic file that can be accessed or loaded using software, firmware or hardware configured to present the digital media item to an entity. In one implementation, the content sharing platform 110 may store the media item 116 using the data store 106.

In implementations, the media viewer 112 at the client device 102 presents a UI 120 that can play multiple media items at the same time. In one implementation, a server (not shown) may be included in the content sharing platform 110. The server may include a server-side media item presentation component that provides the media items to be played in the UI 120 on the client device 102. The server-side media item presentation component can also provide a UI document 114 that the media viewer 112 may use to render the UI 120 on the client device 102. The media viewer 112 may present the media items via embedded media players (e.g., a Flash® player, HTML5 player), such as media player 124 and media player 126, that are embedded in a UI document (e.g., a web page that may provide information about a product sold by an online merchant).

The media viewer 112 can play media items in the UI 120 in response to a user playback request. The media viewer 112 can also play media items without user input (e.g., automatically) when the media items are visible on the screen of the client device 102. The media viewer 112 can include logic to determine when to play media items in the UI 120, such as when the media items can be played in the UI 120 at the same time. For example, the media player 124 can play a first media item **116*a* and prevent the media player 126 from playing a second media item 116*b* while the first media item 116*a* is playing in the UI 120**.

More specifically, in implementations of the disclosure, the media player 124 can be continuously visible in the UI 120 regardless of various user activities with respect to the client device 102. For example, the media player 124 playing the first media item **116*a* may be continuously visible in the UI 120, even while the user simultaneously performs other tasks and activities, such as interacting with the content sharing platform 110 via the media viewer 112 or by interacting with another application on the client device 102 (not shown). In implementations, the continuously visible first media player 124 can be presented as part of an upper layer of the UI 120 and other UI components are presented as part of a UI layer that is below the upper layer. As a result, the UI 120 can provide a "watch-while" experience pertaining to the first media player 124. The "watch-while" experience allows the user of the content sharing platform 110 at client device 102 to continue watching a media item 116, even while engaging in other activities on the client device 102. While the media player 124 is playing a media item 116*a*, the user can browse and interact with other applications, interfaces, functions and menus on the client device 102. For example, the other interfaces, functions and menus may include social networking elements, a suggestions interface of what to watch next, a search interface for media items of the content sharing platform, a browsing interface for media items of the content sharing platform, a settings interface, a subscriptions interface, a playlists interface, a favorites interface, a history interface, an uploads interface, a settings interface, a messaging interface, and so on. The user may interact with these interfaces, functions, and menus as if the media item 116*a* were not playing in the media player 124**.

The UI 120 may present a second media item **116*b*, which may be configured to start playing in the UI 120 without a user playback request. Such media items may be referred to as an "autoplay media item." The second media item 116*b* can be played via a second media player 126. The client device 102 can prevent the media player 126 from playing the second media item 116*b* while the media player 124 that is visible in the UI 120 plays the first media item 116*a*, as further described in conjunction with FIGS. 2-5**.

In some implementations, the UI 120 provides constantly updated content in the form of a feed 114. Various activities can be collected and presented to a user via the feed 114. For example, the feed 114 can include media items from media item sources to which the user is subscribed. Once a user subscribes to a media item source (e.g., a channel), the user can be presented with information from the channel on the feed 114. If a user subscribes to multiple media item sources, media items from each media item source to which the user is subscribed can be combined into a syndicated feed 114.

In some implementations, media item playback is configurable. For example, the content sharing platform 110 can provide configuration options to a user, such as via a graphical user interface (GUI). The configuration options can include settings to autoplay, limit, prioritize, or prevent the display of media items based on type (e.g., advertisements), content (e.g., explicit material), topic (e.g., baseball)

or their association with a particular source or user. For example, a user can configure media item playback such that media items from some media sources are autoplayed, even if another media item is currently playing in the GUI. In another example, a user can set a high priority on media items that are related to baseball, such that when a baseball video is playing and other media items are configured to autoplay, the other media items are prevented from autoplaying while the baseball media items are being played.

In some implementations, the media player 124 is managed by an operating system of the client device and the media player 126 is managed by an application or program on the client device. For example, the media player 124 is provided by an operating system of a mobile device and the media player 126 is provided by a media application on the mobile device. In some implementations, the media player 124 is managed by a first application or program on the client device 102 and the media player 126 is managed by a second application or program on the client device 102.

In situations in which the systems discussed here collect personal information about users, or may make use of personal information, the users may be provided with an opportunity to control whether the content sharing platform 110 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 110.

In some implementations, a first client device 102 is communicably coupled to a second client device (not shown). The first client device 102 can use the second client device as a "second screen." In other words, the first client device 102 can manage media item playback on the second client device 102. For example, the first client device 102 can be a mobile device and the second client device can be a television or a set top box configured to play media items on a television. The first client device 102 can be used to control playback on the television, either directly or via the set top box. When a media item 116*a* is playing on the second client device (e.g., the television) and a user encounters a second media item 116*b* that is to autoplay (either on the client device 102 or the "second screen" device (e.g., the television), the media viewer 112 may prevent the media player 126 from playing the second media item 116*b*, either on the first client device 102 or the second client device, or both, using similar techniques as described herein. For example, while a first video is playing on the television, the user may be browsing content on a mobile device 102. The content may include a second video that is set to autoplay either on the mobile device 102 or the television. Since the first client device 102 manages media item playback on the second client device, the first client device 102 can prevent the second media item from playing on the second client device.

Figure 2:
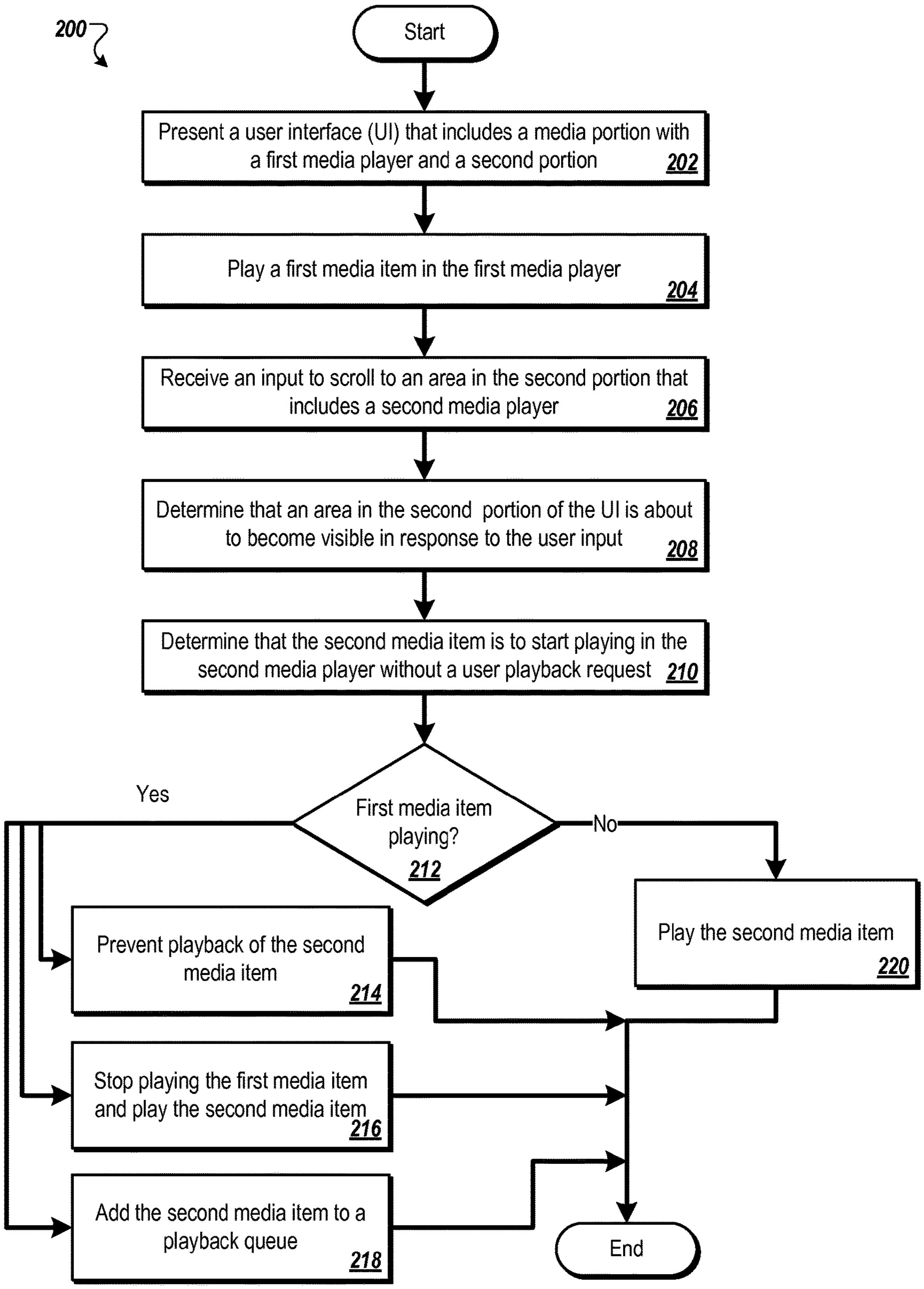
FIG. 2 is a flow diagram illustrating a method for providing playback of one or more media items on a client device, according to some implementations of the disclosure.
Figure 3A:
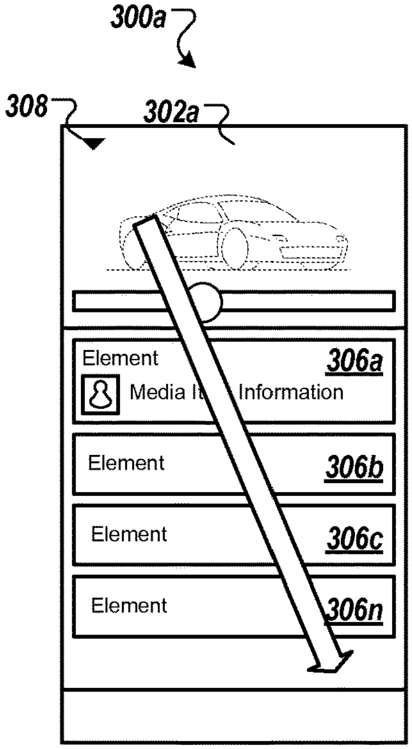
FIGS. 3A, 3B, 3C and 3D are example screenshots illustrating User Interfaces (UIs) for providing media item playback, according to some implementations of the disclosure.
Figure 3B:
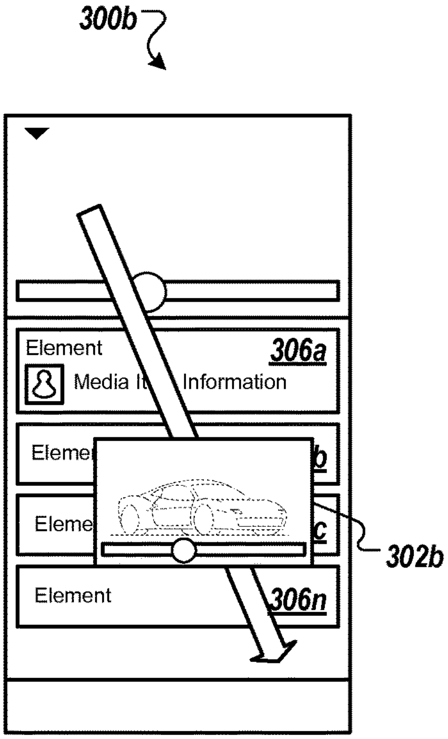
Figure 3C:
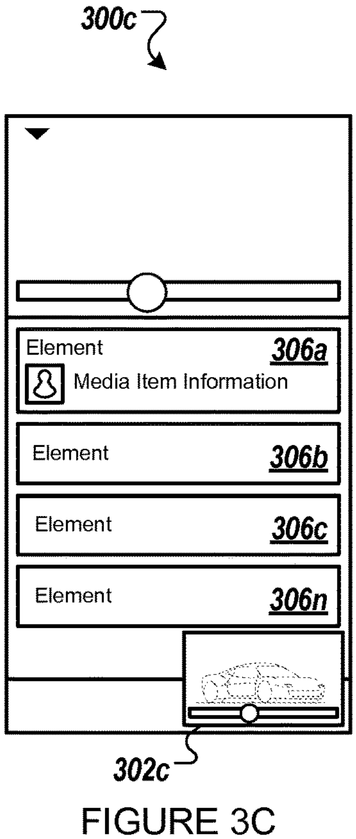
Figure 3D:
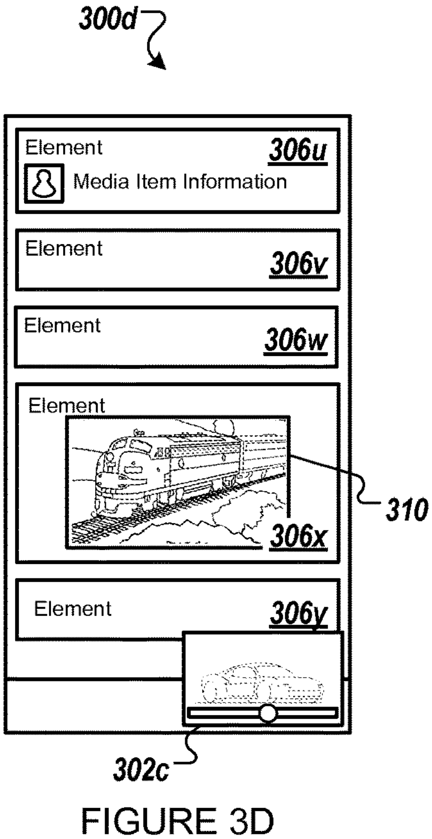

FIG. 2 is a flow diagram illustrating a method 200 for managing playback of one or more media items on a client device, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the client device 102 of FIG. 1.

Referring to FIG. 2, method 200 begins at block 202 when processing logic presents a user interface (UI) that can play multiple media items at the same time. The UI may have a media player portion and a second portion (e.g., scrollable portion). The media player portion can have a first media player to provide playback of a first media item. The media player portion can be continuously visible in the UI for any duration, as described in further detail in conjunction with FIG. 3. Alternatively, the media player portion can be visible for a duration related to the length of a video playing in the first media player or a length of all media items that are queued to play in the first media player.

At block 204, the processing logic plays the first media item in the first media player in the media player portion. The processing logic can play the first media item in the first media player in response to a user playback request. In some implementations, the user playback request is a selection of the first media item in the UI. In implementations, the user request includes user input to play the first media item in the media player portion, as further described in conjunction with FIG. 3. In some implementations, the processing logic can provide playback of the first media item in the first media player without a user request (e.g., autoplay), as described herein.

At block 206, the processing logic receives an input to navigate (e.g., scroll, swipe) to an area in the second portion (e.g., scrollable portion) of the UI. The input can be associated with an input device, such as a mouse, keyboard, touchscreen, trackpad, etc. The input can be a click, a swipe, a gesture, a wheel rotation, etc. The second portion of the UI can include a second media player that can play a second media item. The second portion can be a feed, a channel page, an article, a weblog ("blog") or any other type of electronic document that includes a playable media item.

At block 208, the processing logic determines that an area in the second portion of the UI, that is about to become visible in response to the input received at block 206, includes the second media player.

At block 210, the processing logic determines that the second media item to be played by the second media player is configured to start playing without a user playback request (e.g., the second media item is an autoplay media item). For example, the processing logic can identify metadata associated with the second media item that indicates that the second media item is to automatically play in the UI upon becoming visible in the UI. In some implementations, the processing logic can use the metadata to determine how to play a second media item based on a type of first media item currently playing. For example, the processing logic can determine that a playing media item is a music video. When a second media item is to autoplay, the processing logic can inspect metadata of the second media item to determine how to handle the second media item. For example, when the second media item is also a music video, the processing logic can add the second media item to a playlist for a first media player that includes other music videos. When the second media item is not a music video, the processing logic can handle the second media item differently, such as preventing it from playing in the UI.

At block 212, the processing logic determines whether the first media player is playing the first media item in the media player portion of the UI. If the first media item is being played by the first media player that is visible in the UI, at block 214 the processing logic can prevent the second media player from providing playback of the second media item. In some implementations, the second media item includes an audio component and a video component. When the processing logic prevents the second media player from providing playback of the second media item while the first media item is being played by the first media player that is visible in the UI, the processing logic can adjust or prevent playback of the audio component of the second media item while permitting playback of the video component of the second media item. For example, the processing logic can reduce or mute the volume for the audio component of the second media item. In some implementations, when the processing logic prevents the second media player from playing the second media item while the first media item is being played by the first media player that is visible in the UI, the processing logic can prevent the second media player from playing the video component of the second media item while permitting the second media player to play the audio component of the second media item. In some implementations, while the first media item is being played by the first media player the processing logic can stop playback of the first media item and cause the second media player to play the second media item. In implementations, the audio or play state (e.g., play, pause, play speed) of the first media item may change based on the presence of autoplaying content, i.e. the second media item. For example, a user may be scrolling through an interface document, a UI, a media stream (e.g., a feed), etc. while a watch while player is playing a first media item. While scrolling through the interface document, the user may encounter a video advertisement. In this case, the playing video may be paused or muted while the video advertisement is visible and/or playing in the UI. In implementations, while the first media player is playing the first media item, the processing logic can add the second media item to a playback queue (e.g., a playlist) of a first media player.

In some implementations, while the first media player is playing the first media item that is visible in the UI, at block 216, the processing logic can stop playback of the first media item that is being presented by the first media player and begin playback of the second media item in the second media player. In some implementations, processing logic performs the operations of block 216 in response to receiving input, such as via the UI, to play the second media item. For example, the second media item can begin video playback while muting audio playback. When a user activates the media item in the UI (e.g., touches, clicks), the processing logic can stop audio playback (and the video) of the first media item and can start playback of the audio portion of the second media item.

In some implementations, at block 218, the processing logic can add the second media item to a playlist of a first media player. For example, when the second media item is an advertisement that is set to autoplay upon being presented within a UI, the second media item can be added to the playlist of a watch while player so as to not interrupt playback of the first media item. The processing logic can add the second media item to a playlist in response to determining that a second media item to be played by the second media player is configured to start playing without a user playback request. In some implementations, the processing logic can add the second media item to the playlist in response to a user request to playback the second media item. In some implementations, media items in the playlist are to be played in the first media player. In some implementations, the second media item is to be played by the second media player, such as after the first media player finishes playing the first media item. Alternatively, the second media item can be played in the first media player, as described herein.

When the first media item is not playing in the first media player, the processing logic presents the second media item at block 220. In implementations, the processing logic plays the second media item in the first media player. Alternatively, the processing logic plays the second media item in the second media player. In some implementations, the processing logic plays the second media item, either in the first media player or in the second media player when the first media item is not playing. In some implementations, the processing logic can stop presenting the media player portion (the portion including the first media player) in the UI such that it is no longer visible when the first media player is done playing the first media item.

In some implementations, the processing logic can handle playing media items differently based on the media item type. For example, some media items may be live streamed while others may be video on demand (VOD). The processing logic may handle live streamed content differently than VOD. For example, when the second media item is a video advertisement, it may not take precedence over the first media item if the first media item is being live streamed. In another example, playback of the first media item may otherwise be uninterrupted by another media item (e.g., the second media item) which appear in the UI except when the other media item is a live media item.

FIGS. 3-5 are example UIs for handling playback of multiple media items in accordance with some implementations. FIGS. 3A-D illustrate four example states 300*a-d* of a UI 300 that can include a "watch while" media player portion and a scrollable portion, in accordance with some implementations. FIG. 3A illustrates an example state 300*a* of UI 300. When in state 300*a*, the UI can play media item 302*a*. The UI can receive input, such as from a user, to play the media item 302*a* in a continuously visible media player, which is shown as 302*c* in FIGS. 3C-D. The user input can include a gesture (e.g., click, touch, press, swipe). For example, a user can press a "continuous play" UI button, such as button 308. In another example, the user can touch the media item in the UI and move or swipe the media item (FIG. 3B) to a predetermined location, such as the bottom right corner of the UI as illustrated in FIGS. 3C-D. In implementations, the media item changes sizes and/or proportions as it is moved to the predetermined location (as illustrated in UI states 302*b* and 302*c*). Once in the continuously visible portion of the UI, the media item may be presented as part of an upper layer that is above other items presented in the UI 300. In some implementations, the UI 300 is a scrollable document that includes any number of elements 306*a-n*. The elements 306*a-n* can be any type or kind of document element, such as a post, feed item, blurb, social message, blog entry, news item, media item, aggregation item, or the like. For example, the elements 306*a-n* can include status updates shared by a user's social contacts within a social network. In implementations, an element can include one or more media items 302. When the user navigates to other portions of the UI, some of the elements 306*a-n* may disappear from view while the continuously visible portion remains visible in the UI. The UI can include elements 306*a-n* and upon user input to navigate to another portion of the UI, any or all of elements 306*a-n* can disappear from view. In FIG. 3D, a second portion of the UI is visible. The second portion of the UI includes elements 306*u-y* and element 306*x* includes a media item 310 that is configured to start playing without a user playback request (e.g., the media item 310 is configured to autoplay when it becomes visible in UI 300). If the media item 302*c* is playing when media item 310 becomes visible in the UI 300*d*, processing logic can prevent the media item 310 from starting to play. The processing logic can also add the second media item 310 to a playlist, or can stop playback of media item 302*c* and start playback of media item 310, among other operations, as described herein.

FIGS. 4A-D illustrate four example states 400*a-d* of a UI 400 that can include a media player portion and a scrollable portion, in accordance with some implementations. In some implementations, the media player portion can move on the screen (e.g., according to a user scrolling through the scrollable portion) but can remain visible at an edge of the UI depending on the direction of the scroll. Such a media player portion can sometimes be referred to as a "sticky" media player. The UI 400*a* includes a media item 402 and any number of content elements 406*a-s* (elements 406*a-f* shown in FIG. 4A). The media item 402 can be played in a media player that is provided by a content sharing platform or part of an operating system, as described in conjunction with FIG. 1. The elements 406*a-r* can be any type or kind of document element, as described in conjunction with FIGS. 3A-D. The media item 402 can begin playback in response to a user playback request. Alternatively, the media item 402 can start playing without a user playback request (e.g., autoplay), as described herein.

When a user navigates through (e.g., scrolls) the UI 400*a*, the position of elements 406*a-r* may change with respect to the user's navigation input. For example, when the user scrolls the UI 400 upward, elements 406*a-c* at the top of the UI 400*a* appear to move off of the visible portion of the UI and elements below the visible portion of the UI 400 (e.g., elements 406*g-r*) can appear.

Figure 4A:
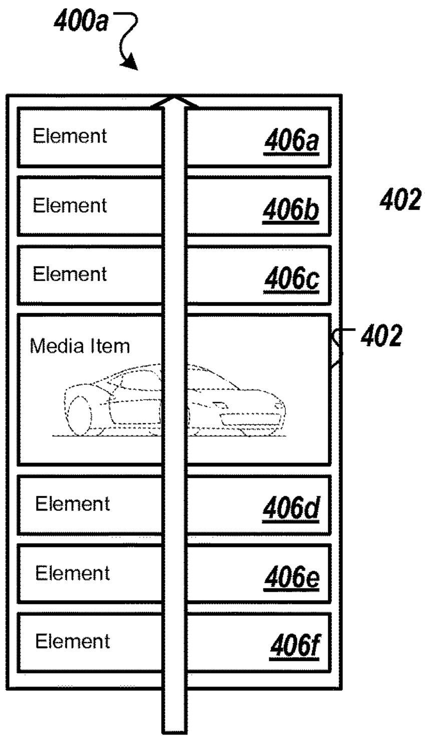
FIGS. 4A-D illustrate four example states of a UI that can include a media player portion and a scrollable portion, according to some implementations of the disclosure.
Figure 4B:
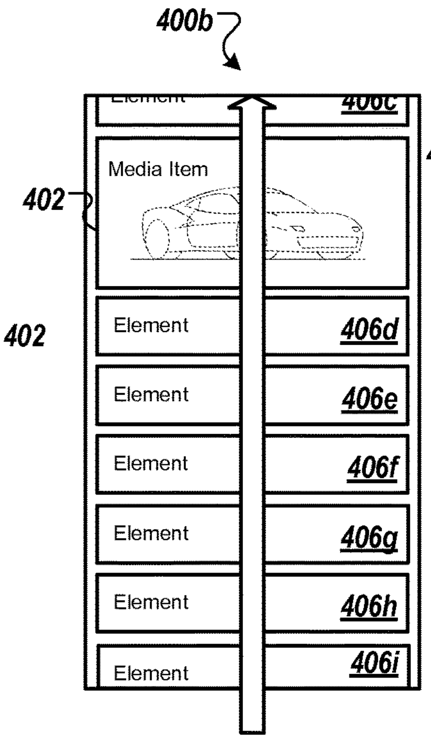

In the UI 400*b* of FIG. 4B, the position of the elements 406 and media item 402 has changed with respect to their respective positions in FIG. 4A. Namely, elements 406*a-c* at the top of the UI 400*a* are no longer visible in UI 400*b*, the media item 402 is now near the top of the UI 400*b* and additional elements 406 *g-i* now appear at the bottom portion of the UI 400*b*.

Figure 4C:
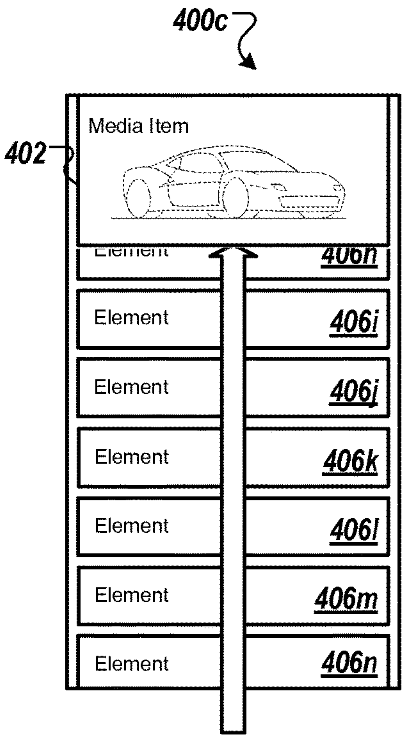

In the UI 400*c* of FIG. 4C, the user has continued to scroll the UI 400 upward. Some elements that were positioned below the media item 402 (e.g., elements 406*d-h*) are now no longer visible on the UI 400*c*, although the media item 402 remains visible (e.g., the media item 402 "sticks" to the top or bottom of the UI while the elements move out of view). In some implementations, the media item 402 remains visible if it is playing when the user scrolls the UI 400*c*, even if the scroll would conventionally move the media item 402 off of the visible portion of the UI 400. The user may interact with any interfaces, functions, and menus as the user would without the media item 402 being present on the screen, and the playback of the media item 402 will not be interrupted.

The modified position of the media item 402 can depend on which direction a user is scrolling relative to the media item 402. If the user scrolls up so that the content is moving down and the elements 406 at the bottom leave the visible portion of the UI, then the media item 402 can appear at the bottom of the UI 400. Alternatively, if the top media item element leaves the UI 400, then the media item 402 would appear on the UI 400 at the top. In implementations, when the scrollable document is scrolled in an opposite direction, which is downward according to the example described above, then the media item can remain stationary until the media item's original position in the scrollable documents is aligned with the media item 402, after which the media item 402 can move at the same rate of travel across the UI as the elements.

Once the media item 402 is playing, a user can activate (e.g., click, select, touch) the media item 402. Activation of the media item 402 can result in variety of different behaviors. In one implementation, clicking on the media item 402 pauses it and various gestures (e.g., swipe) will dismiss it or change to a next or previous media item in a playlist. In another implementation, clicking on the media item 402 might mute it or if the media item 402 is an ad, it might redirect the user to a page for the advertised product. In some implementations, at the end of presentation of the media item, a call to action is presented to the user via the UI, such as an invitation to click a link or to be directed to a particular website or application.

Figure 4D:
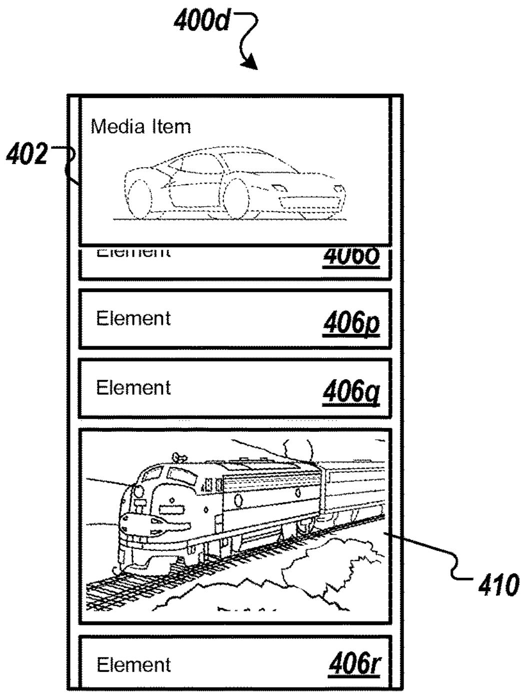

FIG. 4D illustrates a second media item 410 that is presented in UI 400*d* as the user navigates the scrollable portion of the UI 400. The second media item 410 can be intended to start playing without a user playback request (e.g., the media item 410 is configured to autoplay when it becomes visible in UI 400). If the media item 402 is playing when the second media item 410 becomes visible in the UI 400*d*, processing logic can prevent the media item 410 from starting to play. The processing logic can also add the media item 410 to a playlist, or can stop playback of media item 402 and start playback of 410, as described herein.

In one implementation, the media item 402 remains visible above any operation, function, or application while the user is interacting with an electronic device, such as client device 102 of FIG. 1. The user may browse and/or interact with interfaces, functions and menus related to any application or operating system of the electronic device. For example, the other interfaces, functions and menus may include a suggestions interface of what to watch next, a search interface for media items of the content sharing platform, a browsing interface for media items of the content sharing platform, a settings interface, a subscriptions interface, a playlists interface, a favorites interface, a history interface, an uploads interface, a different application, and so on. The user may interact with these interfaces, functions, and menus without interrupting playback of the media item.

Information corresponding to the media item currently playing in the media player portion, such as metadata, may be shown in a media item information portion of the UI 400. For example, information about a video, such as its title, view count, likes, etc. can be presented via the UI 400.

Additional menu options (not shown) related to the media item currently playing in the media player portion may also be shown in UI 400, such as play, pause, stop, fast forward, rewind, social post, add comment, etc. In some implementations when a user is viewing the UI 400 on a large screen, all or part of metadata can remain visible with the media player portion. In implementations, the media player portion can include an icon or a "tag" that a user can activate to bring the corresponding post back on screen.

In implementations, the metadata can appear within the UI 400, but when a user scrolls to another portion of the scrollable portion and the media player portion appears, the metadata can collapse to a minimized form. In some instances, when a user activates a media item, the metadata can expand. The metadata can expand over other elements of the scrollable portion. Alternatively, the other elements of the scrollable portion can be moved to make room for presentation of the metadata. Metadata can disappear, or be presented inside the media player portion and can cover part of a playing media item. The media player portion may include a minimization indicator (not shown). The user may minimize the media player portion within the UI 400 by selecting the minimization indicator.

The media player portion may be implemented in any of a variety of sizes and is not limited to a specific position within a particular UI. The media player portion may also be moved (e.g., dragged) within the UI to suit the user's preferences. In one implementation, the media player portion may be "snapped" or "docked" to a position within the UI. For example, the media player portion may be positioned relative to other elements of the UI within a media viewer and/or outside of a media viewer. In implementations, the media player portion can be resized to different pre-determined sizes. In some implementations, the user may tap on the media player portion to return the scrollable portion to a position where the media item is presented and/or located.

In another implementation, the media player portion may be presented in a semi-transparent format while the user is performing other activities in the UI of a media viewer, such as media viewer 112 of FIG. 1. The user's interaction with the UI may be passed through to the media viewer below the semi-transparent player, and the user could, for example, browse while watching the media player portion.

Figure 5A:
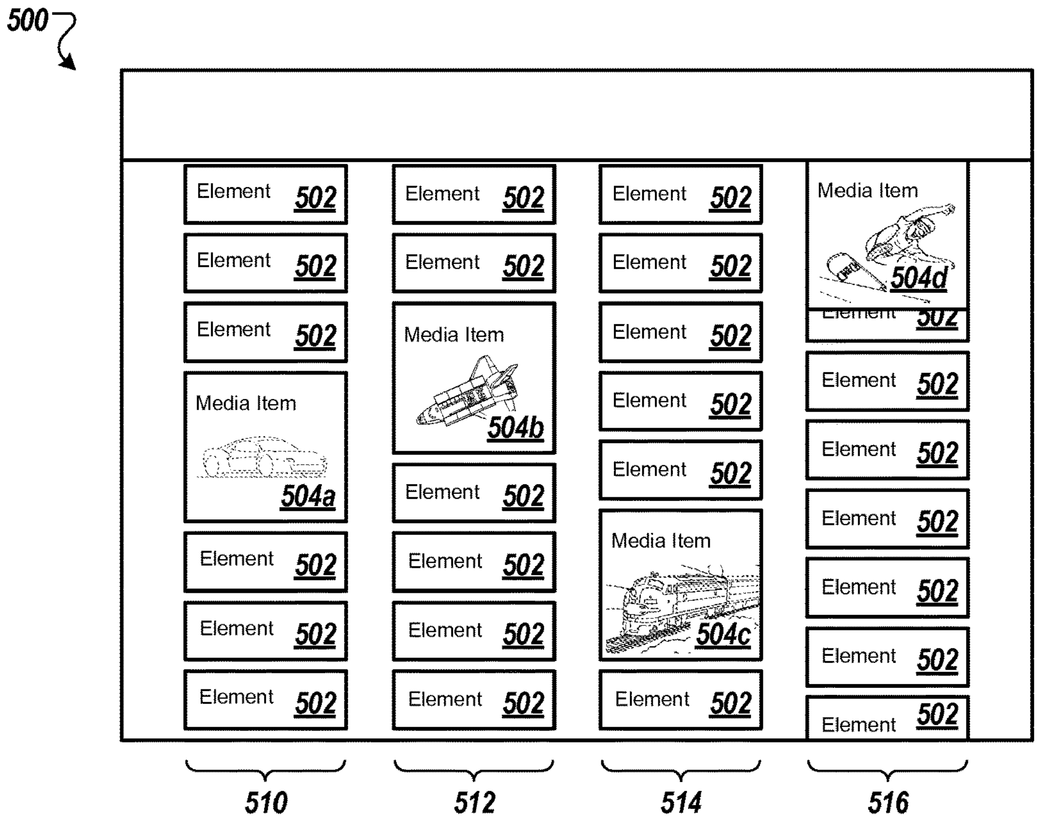
FIG. 5A illustrates an example screenshot of a visible portion of a UI that includes multiple columns that each include at least one element and at least one media item, according to some implementations of the disclosure.

FIG. 5A illustrates an example screenshot of a visible portion of a UI 500 that includes multiple columns 510-516 that each includes at least one element 502 and at least one media item 504. The UI 500 can include any number of columns. Each column can be scrolled independently in any direction. As illustrated, the columns are vertically scrollable and include columnar elements that are vertically arranged. Column 510 includes media item 504*a*, column 512 includes media item 504*b*, column 514 includes media item 504*c*, and column 516 includes media item 504*d*. In implementations, as the columns are scrolled, media items 504 can appear within the UI. When one media item is playing (e.g., media item 504*a*), processing logic can prevent other media items (e.g., media items 504*b-d*) from playing and/or autoplaying within the UI. In implementations, the processing logic can also add the other media items to a playlist, or can stop playback of media item 402 and start playback of one or more of the other media items, as described herein. In implementations, when a media item 502*a* is playing back, other media items 502*a-d* can be rendered within the UI 500 in different ways, such as being rendered as thumbnails, with a play button, etc.

In implementations, clicking a media item (e.g., 504*b*, 504*c*, 504*d*) while another media item is playing (e.g., 504*a*) can add that media item to a playlist. Alternatively, each media item 504 can have a separate button, that when clicked, adds the respective media item to the playlist. Other implementations include autoplaying a second media item immediately after the first media item 504*a* finishes playing. In further implementations, media items that are not playing can have two buttons—one to play the media item immediately and one to add the media item to a playlist.

Figure 5B:
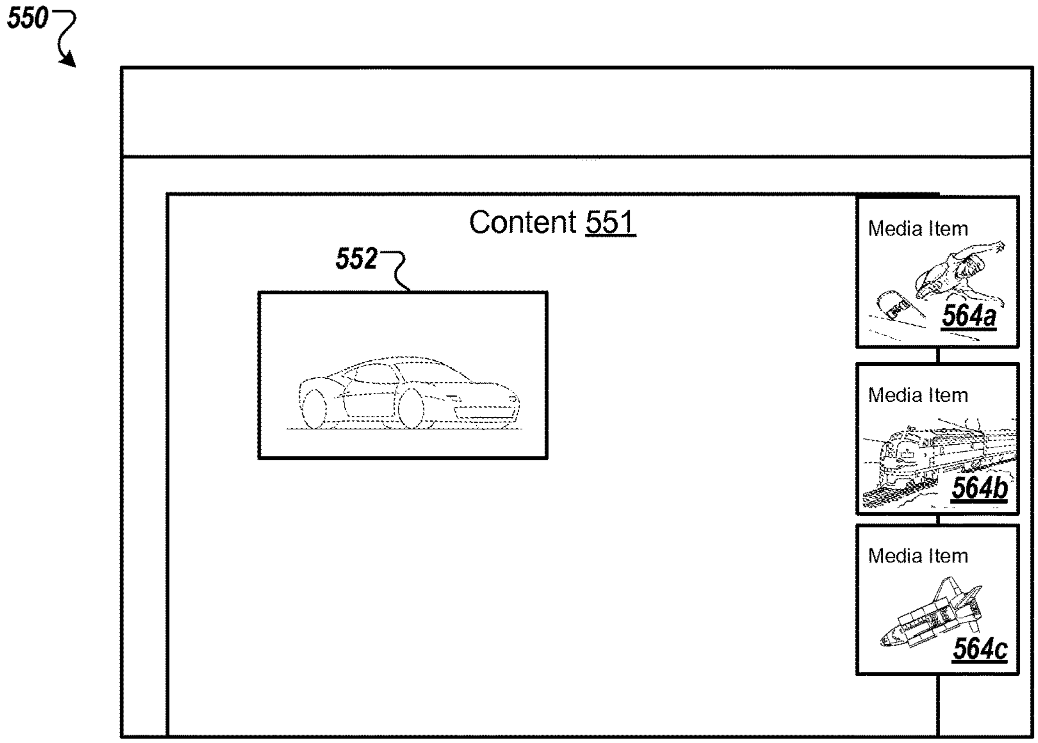
FIG. 5B illustrates an example screenshot of a UI with more than one media player portions, according to some implementations of the disclosure.

FIG. 5B illustrates an example screenshot of a UI 550 with more than one media player portions 564. Each of the media player portions can be playing a media item 564*a-c*. In some implementations, each of the media player portions are playing video of each of the media items while audio of each of the media items is muted, volume limited, or otherwise not playing back. In some implementations, one of the media players 546*a* can be playing both video and audio of the media item while the other media players 564*b* and 546*c* are playing video but not audio of their respective media items.

In implementations, a user can be browsing content 551 (e.g., social networking, browsing a content sharing platform, reading a news article) and can encounter a media item 552 that is to be played by a media player that is configured to start playing the media item 552 without a user playback request. In such implementations, when one or more media items are playing (e.g., media items 564*a-c*), processing logic can prevent other media items (e.g., media item 552) from playing and/or autoplaying within the UI. In implementations, the processing logic can also add the media item 552 to a playlist, or can stop playback of media items media items 564*a-c* and start playback of 552, as described herein. In some implementations, the media item 552 can be played back in addition to other media items (e.g., media items 564*a-c*) that are being played back. When playing back the media item 552, processing logic can cause playback of the media item 552 in the same manner as the other playing media items 564*a-c*. (e.g., the media item 552 can inherit the playback characteristics of the playing media items 564*a-c*). For example, when the media items 564*a-c* are playing video and not audio, the media item 552 can likewise be played back with video but not audio. In implementations, the playing media items 564*a-c* are moved on the UI 550 to accommodate media item 552. The media items 552 and 564*a-c* can be evenly spaced in the UI 550.

In implementations, any media player portion of any UI described herein may be minimized, maximized, and/or dismissed via gesture controls that are relative to the media player portion of the UI. Regardless of a location of the media player portion within the UI, gesture controls detected with respect to the media player portion of the UI may operate to change a view of the media player portion.

Figure 6:
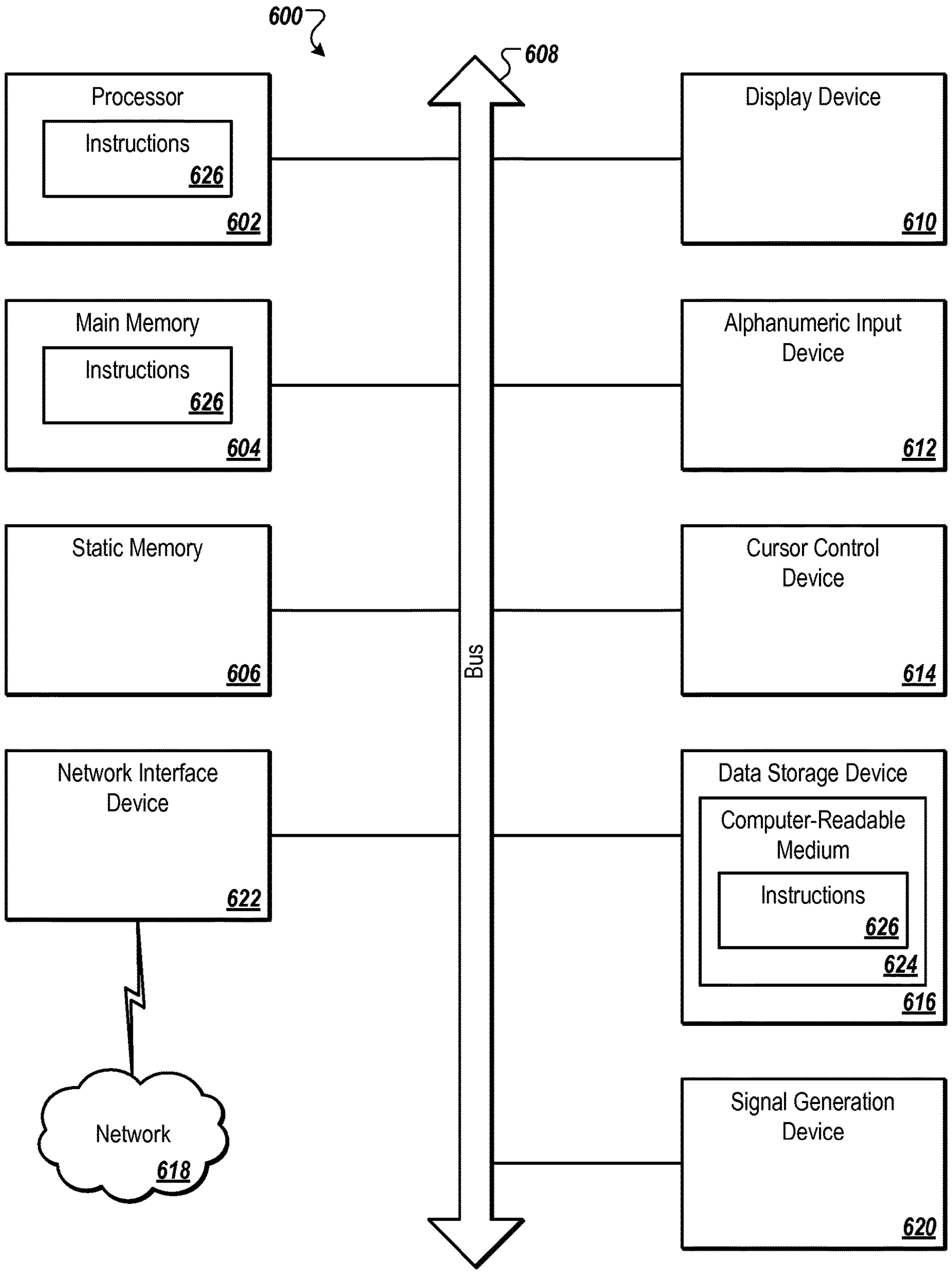
FIG. 6 is a block diagram illustrating an example computer system, according to some implementations.

FIG. 6 illustrates a diagrammatic representation of a machine in the example form of a computer system 600 within which a set of instructions, for causing the machine to perform any one or more of the operations or methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the operations or methodologies discussed herein.

The example computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and methodologies discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 618 via the network interface device 622.

In one implementation, the instructions 626 include instructions for a providing one or more dynamic media players, which may correspond, respectively, to the first media item presentation component 124 and/or the second media item presentation component 126 with respect to FIG. 1, and/or a software library containing methods that provide one or more dynamic media players player for a content sharing platform. While the computer-readable storage medium 624 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "presenting", "scrolling", "determining", "enabling", "preventing," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

presenting, by a processor of an electronic device, a first media player and a plurality of elements in a user interface (UI);

providing a first playback of a first media item in the first media player in the UI;

in response to receiving user input, scrolling the plurality of elements to scroll out of view, from the UI, one or more of the plurality of elements that were visible in the UI prior to the user input, and to scroll into view, in the UI, a second media player that was not visible in the UI prior to the user input, wherein the first media player remains visible in the UI during the scrolling;

determining that the second media player is configured to start, in response to the second media player being scrolled into view in the UI, a second playback of a second media item without a user playback request;

determining that the second playback of the second media item has priority over the first playback of the first media item; and responsive to the determining that the second playback has priority over the first playback, stopping the first playback of the first media item and providing the second playback of the second media item without the user playback request.

2. The method of claim 1, wherein the stopping of the first playback of the first media item comprises pausing the first playback of the first media item, wherein the method further comprises resuming the first playback of the first media item subsequent to the providing of the second playback of the second media item.

3. The method of claim 1 further comprising providing a third playback of at least a portion of the first media item in response to the stopping of the first playback, wherein the third playback of the first media item is at a higher playback speed than the first playback of the first media item, wherein the providing of the second playback is subsequent to the providing of the third playback.

4. The method of claim 1, wherein the determining that the second playback has priority over the first playback comprises determining that the second media item comprises live streamed content and that the first media item is non-live streamed content, wherein the live streamed content has priority over the non-live streamed content.

5. The method of claim 1, wherein the determining that the second playback has priority over the first playback is based on settings to prioritize display of media items based on one or more of type, content, topic, or association with a particular source or user.

6. The method of claim 1, wherein the stopping of the first playback of the first media item comprises stopping playback of an audio component of the first media item.

7. The method of claim 1, wherein the stopping of the first playback of the first media item comprises stopping playback of an audio component of the first media item while permitting playback of a video component of the first media item, wherein the playback of the video component of the first media item is simultaneous with the second playback of the second media item.

8. An electronic device comprising:

a memory; and a processing device communicably coupled to the memory, the processing device to execute instructions to:

present a first media player and a plurality of elements in a user interface (UI);

provide a first playback of a first media item in the first media player in the UI;

in response to receiving user input, scroll the plurality of elements to scroll out of view, from the UI, one or more of the plurality of elements that were visible in the UI prior to the user input, and to scroll into view, in the UI, a second media player that was not visible in the UI prior to the user input, wherein the first media player remains visible in the UI during scrolling of the plurality of elements;

determine that the second media player is configured to start, in response to the second media player being scrolled into view in the UI, a second playback of a second media item without a user playback request;

determining that the second playback of the second media item has priority over the first playback of the first media item; and responsive to determining that the second playback has priority over the first playback, stop the first playback of the first media item and provide the second playback of the second media item without the user playback request.

9. The electronic device of claim 8, wherein to stop the first playback of the first media item, the processing device is to pause the first playback of the first media item, wherein the processing device is further to resume the first playback of the first media item subsequent to providing the second playback of the second media item.

10. The electronic device of claim 8, wherein the processing device is further to provide a third playback of at least a portion of the first media item in response to stopping the first playback, wherein the third playback of the first media item is at a higher playback speed than the first playback of the first media item, wherein providing of the second playback is subsequent to the providing of the third playback.

11. The electronic device of claim 8, wherein to determine that the second playback has priority over the first playback, the processing device is to determine that the second media item comprises live streamed content and that the first media item is non-live streamed content, wherein the live streamed content has priority over the non-live streamed content.

12. The electronic device of claim 8, wherein to determine that the second playback has priority over the first playback is based on settings to prioritize display of media items based on one or more of type, content, topic, or association with a particular source or user.

13. The electronic device of claim 8, wherein to stop the first playback of the first media item, the processing device is to stop playback of an audio component of the first media item.

14. The electronic device of claim 8, wherein to stop the first playback of the first media item, the processing device is to stop playback of an audio component of the first media item while permitting playback of a video component of the first media item, wherein the playback of the video component of the first media item is simultaneous with the second playback of the second media item.

15. A non-transitory machine-readable storage medium storing instructions which, when executed, cause a processing device to perform operations comprising:

presenting a first media player and a plurality of elements in a user interface (UI);

providing a first playback of a first media item in the first media player in the UI;

in response to receiving user input, scrolling the plurality of elements to scroll out of view, from the UI, one or more of the plurality of elements that were visible in the UI prior to the user input, and to scroll into view, in the UI, a second media player that was not visible in the UI prior to the user input, wherein the first media player remains visible in the UI during the scrolling;

determining that the second media player is configured to start, in response to the second media player being scrolled into view in the UI, a second playback of a second media item without a user playback request;

determining that the second playback of the second media item has priority over the first playback of the first media item; and responsive to the determining that the second playback has priority over the first playback, stopping the first playback of the first media item and providing the second playback of the second media item without the user playback request.

16. The non-transitory machine-readable storage medium of claim 15, wherein the stopping of the first playback of the first media item comprises pausing the first playback of the first media item, wherein the operations further comprise resuming the first playback of the first media item subsequent to the providing of the second playback of the second media item.

17. The non-transitory machine-readable storage medium of claim 15, wherein the operations further comprise providing a third playback of at least a portion of the first media item in response to the stopping of the first playback, wherein the third playback of the first media item is at a higher playback speed than the first playback of the first media item, wherein the providing of the second playback is subsequent to the providing of the third playback.

18. The non-transitory machine-readable storage medium of claim 15, wherein the determining that the second playback has priority over the first playback comprises determining that the second media item comprises live streamed content and that the first media item is non-live streamed content, wherein the live streamed content has priority over the non-live streamed content.

19. The non-transitory machine-readable storage medium of claim 15, wherein the determining that the second playback has priority over the first playback is based on settings to prioritize display of media items based on one or more of type, content, topic, or association with a particular source or user.

20. The non-transitory machine-readable storage medium of claim 15, wherein the stopping of the first playback of the first media item comprises stopping playback of an audio component of the first media item while permitting playback of a video component of the first media item, wherein the playback of the video component of the first media item is simultaneous with the second playback of the second media item.

* * * * *